Dec. 31, 1957  C. ZIEGLER ET AL  2,818,357
METHOD OF PRODUCING TRANSFORMATION PRODUCTS
OF HIGH MOLECULAR CARBOHYDRATES
Filed July 10, 1953
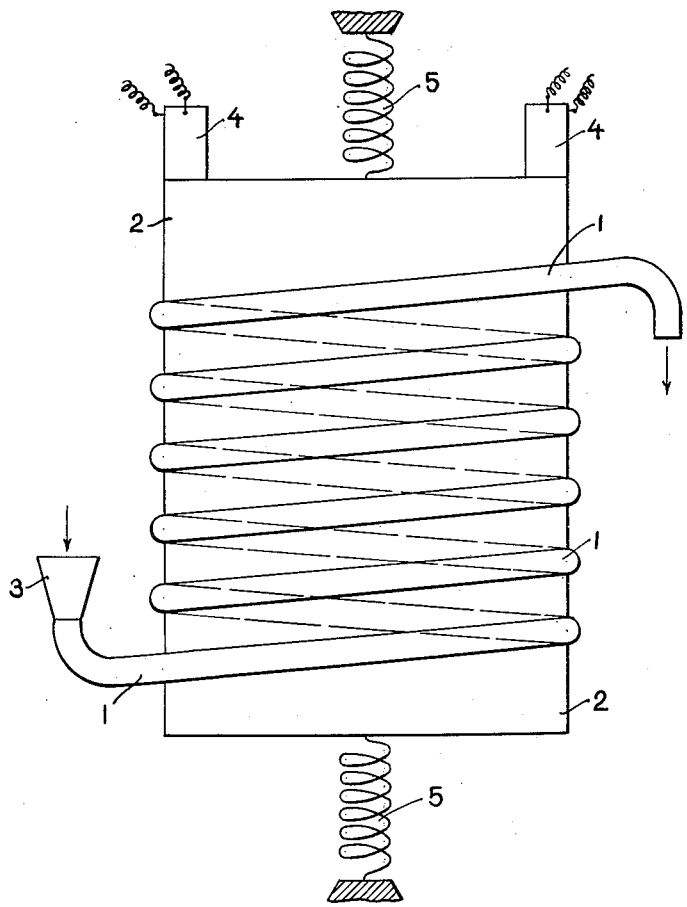
INVENTOR.
CARL ZIEGLER, RUDOLF KÖHLER
HANS RÜGGEBERG
BY
ATTORNEYS

2,818,357

METHOD OF PRODUCING TRANSFORMATION PRODUCTS OF HIGH MOLECULAR CARBOHYDRATES

Carl Ziegler, Dusseldorf-Holthausen, Rudolf Köhler, Dusseldorf, and Hans Rüggeberg, Dusseldorf-Benrath, Germany, assignors to Henkel & Cie, G. m. b. H., Dusseldorf-Holthausen, Germany, a corporation of Germany Application July 10, 1953, Serial No. 367,282

Claims priority, application Germany July 12, 1952

13 Claims. (Cl. 127—36)

This invention relates to the production of transformation or degradation products of high molecular carbohydrates and their derivatives, by heating, into products of improved chemical and/or physical properties.

A number of technical processes are known for causing changes and variations in the chemical and/or physical properties and characteristics of pourable high molecular carbohydrates such as starches, dextrins, pectins, cellulosic products, and the like, or their derivatives. Said processes consist in heating the material to be transformed, usually in a dry state, in a heated container while stirring by means of agitating paddles, arms, scrapers, or the like. In apparatus of such type, only the material in immediate proximity to the stirring means is in agitation. Therefore it is unavoidable that particles of the material to be transformed which are in immediate proximity to the container wall are heated to a higher temperature during the short rest periods between the passage of said agitating means than those particles which are present in the inner part of the mass undergoing treatment. Since high molecular carbohydrates are sensitive to heat, decomposition may be caused by such irregular heating. To avoid such decomposition it is necessary to carefully heat the material, i. e., to operate under conditions whereby the temperature difference between heating agent and material to be transformed is only slight. Therefore, under normal condition of prior art practice, poor and ineffective transmission of heat takes place and prolonged heat treatment of the material is necessary, which reduces the output of apparatus of a given size, increases costs of production and, more objectionable, leads to products of non-uniform composition and characteristics.

It is one object of this invention to provide a process of heating and transforming high molecular carbohydrates into valuable products, which process avoids the disadvantages of the heretofore used processes.

Another object of the invention is to provide a process and apparatus for treating pourable high molecular carbohydrates, by heat or otherwise, to convert them into more valuable products, which will provide for a large throughput of material for apparatus of a given size, with absolute uniformity of treatment.

Another object of the invention is to provide a process for the heat treatment and conversion of starch, dextrins, cellulosic products and the like into transformation or degradation products of superior physical and chemical properties by subjecting the said materials in a dry pourable state to treatment while being conveyed under agitation so that every portion of the product is uniformly treated to provide for uniform conversion thereof.

Various other objects of this invention and advantageous features thereof will become apparent as the description proceeds.

In principle, the process of this invention consists in carrying out transformation of high molecular carbohydrates or their derivatives in a heated screw-shaped or helical conveyor path or tube wherein said material is agitated and moved by causing said screw-shaped or helical conveyor to oscillate or vibrate. Depending on the pitch and the rate and amplitude of the vibrations, pourable or pulverulent materials may be caused to flow through such a device in either a downward or an upward direction.

Devices for conveying pourable materials by means of oscillation or vibration have been described, for instance, in German Patent Nos. 683,473 and 695,938. A device suitable for carrying out the improvements described in the following examples is diagrammatically illustrated by the accompanying drawing, which shows a spiral or helical coil 1, having at its lower end a feeding funnel 3. Said spiral or helical coil 1 is wound around frame 2 and forms therewith a rigid unit. Vibrating or oscillating means 4 is attached to said frame to cause oscillation or vibration of frame 2 and, thus, of coil 1. The oscillating means may be electric vibrators, rotating cams, or the like, and the frame 2 may be suspended on spiral springs 5 or other flexible or semi-rigid mountings. The frequency and amplitude of the vibrations may be changed to suit the material undergoing treatment and in general the frequency of the vibrations may be from a few hundred to a few thousand per minute and of an amplitude of a few millimeters, for instance, 5 millimeters. Said oscillations or vibrations are transmitted from said coil 1 to the pourable material passing therethrough and cause said material to pass through said coil, and to be agitated, turned and moved therethrough so that all portions of the said material are uniformly heated or otherwise treated and no part of the material is permitted to adhere to the walls of the tube or otherwise be overheated or overtreated.

It is possible to cause the material to move downwardly within said tube or to be conveyed upwardly contrary to gravitation by varying the frequency and amplitude of the oscillations or vibrations and the slope of the turns of the tube 1.

The time during which the material remains in the conveyor tube may also be adjusted by varying frequency and/or amplitudes of said oscillations or vibrations and the slope or inclination of the tube turns.

Other devices than that described may, of course, also be used for the purpose of this invention, such as, for example, open troughs, provided they are adapted to convey the material to be transformed by oscillation or vibration.

Several such conveyor devices may be arranged one after the other. Thereby transformation may be effected step by step at various temperatures, or further reaction may be stopped immediately by conducting the material into a cooled conveyor device.

The conveyor path may be heated by hot gases, flames, electricity, steam, heated liquids capable of transmitting heat, ultra red rays, or other heating means, and the apparatus illustrated in the drawings may be enclosed in heated chambers, or the like. When tubes are used as the conveyor path, it is possible to pass gases through said tubes during treatment of the material or to exclude air therefrom. Such gases may serve as reaction components, protective gas, or as means for carrying along and removing gaseous or vaporous reaction products. Such gases are, for instance, steam, air, oxygen, nitrogen, nitrogen oxides, ammonia, hydrogen, carbon monoxide, carbon dioxide, sulfur dioxide, sulfur trioxide, chlorine, hydrogen chloride, nitric acid, and others, or mixtures thereof. Under special circumstances it is of advantage to use open troughs in the place of tubes as illustrated in the drawing and, if desired, to enclose the entire apparatus in a heated chamber because thereby intimate contact of the preferably gaseous heating medium with the solid material to be transformed is made possible.

High molecular carbohydrates which can be subjected to the process according to this invention are, for instance, cellulose, starch, pectins, or substances containing these materials. Derivatives of such high molecular carbohydrates which may be treated according to the process of this invention are, for instance, alkali cellulose, alginates, ethers or esters of such high molecular carbohydrates, and others.

The process according to this invention, for instance, may advantageously be used for the production of degradation products of starch. Starch is preferably first treated with a small amount of hydrochloric acid or nitric acid and is then dried. When introducing such a pretreated starch into the above described apparatus and heating the helical coil during the passage of such starch to a temperature between 100° C. and 250° C. and preferably between 120° C. and 200° C., while exposing said coil to the action of a device generating oscillations or vibrations, dextrins of excellent properties are produced within a few minutes of treatment. Such dextrins, or other starch degradation products, are characterized by complete uniformity of the product, and as the throughput of the apparatus is continuous and of relatively large volume, the cost of the treatment is relatively low. Dextrins produced in this manner are distinguished over heretofore produced dextrins by their light color and by their extraordinarily uniform qualities. Since the starch need only remain in the helical coil for a few minutes, even comparatively small apparatus units allow the production of large quantities of dextrin. The output, consequently, is very high.

When producing dextrin or other degradation products of starch according to this invention, the further advantage is achieved that the apparatus may be kept completely sealed so that the danger of formation of explosive dust outside the apparatus is avoided. It is also possible to vary extensively the degree of degradation by suitably adjusting temperature and duration of treatment. Thus not only soluble starch of only slight degree of degradation may be obtained, but also dextrins capable of yielding very thin aqueous solutions, and any kind of intermediate degradation products.

A further important advantage of the present invention is the fact that fully continuous operation is possible. Said continuous operation, in combination with the low cost of the apparatus and its high production capacity, together with the other above mentioned advantages, makes the process especially valuable and advantageous.

It is furthermore possible to carry out chemical reactions between solid substances in accordance with the process and apparatus herein described. Thus, for instance, ethers of cellulose or starch may be obtained by heating a pourable mixture of cellulose or starch with alkali and chloro acetic acid according to the process described. In this case it has been proved to be of special advantage that air can readily be excluded during reaction. Complete exclusion of air is of great importance because thereby undesired degradation of cellulose is avoided. On the other hand, it is possible to readily achieve any desired degree of degradation by working in the presence of small amounts of oxygen.

Likewise, alkali cellulose can readily be converted into cellulose ethers by introducing gaseous etherifying agents, such as methyl chloride, ethyl chloride, ethylene oxide or the like, into the apparatus. Furthermore, mixtures of starch and paraformaldehyde may be treated in the manner described above. Preferably starch is used in this reaction which has been subjected to a pre-treatment with acid. In this manner valuable reaction products of starch and formaldehyde are obtained.

It is, of course, also possible to subject other heat-sensitive materials to a degradation process according to the present invention. Thus, for instance, the sodium salt of alginic acid, when it is in pourable condition, may be converted into products of lower viscosity by heat treatment such as described, which new products may be used for many industrial purposes.

For carrying out the last mentioned transformations and reactions, it is usually sufficient to proceed at lower temperatures, for instance, at temperatures between 30° C. and 140° C., and preferably between 40° C. and 120° C.

Oscillations or vibrations of a frequency between about 500 and about 2000 per minute and of an amplitude between about 1 mm. and about 5 mm. are preferably applied to the reaction container, although the invention is not limited to such frequencies and amplitudes.

The following examples serve to illustrate this invention, without, however, limiting the same thereto.

Example 1

1000 parts by weight of commercial dry potato starch are sprayed with 1.2 parts by weight of nitric acid dissolved in 50 parts by weight of water and are dried in a vacuum drier until its moisture content is between 3% and 5%. The starch, after such pre-treatment, is passed through a helical coil, such as illustrated in the drawings, which is heated to 170° C. The coil is caused to vibrate with a frequency of about 1250 vibrations per minute and an amplitude of about 2–4 mm. The starch remains in said vibrating tube for about 12 minutes. The resulting reaction product is passed, subsequently, through a second cooled helical coil from which it is discharged in the cooled state after about 10 minutes. In this manner, dextrin of light yellow color is obtained, the aqueous solutions of which are more fluid than those of dextrin produced without pretreatment of starch with nitric acid.

Example 2

1000 parts by weight of cornstarch containing 14% of water are dried in a vacuum to a moisture content of 4–6%. Said dried starch is roasted by passing it through a helical coil, such as described above, at 150° C. for 40 minutes while said coil is subjected to oscillations of a frequency of 1250 per minute and of an amplitude of 2–4 mm. The discharged cornstarch is then cooled. A British gum of excellent uniformity is obtained thereby.

Example 3

1000 parts by weight of tapioca starch are uniformly moistened with 50 parts by weight of an aqueous solution containing 0.4 parts by weight of hydrochloric acid, and are then dried in a vacuum. Said dried starch is mixed with 3 parts by weight of paraformaldehyde and is heated in a helical coil at 115° C. for 20 minutes, said coil being subjected to oscillations of a frequency of 1250 per minute and of an amplitude of 2–4 mm. The treated material runs from said coil into a second coil where it is heated at 160° C. for 12 minutes while being subjected to oscillations of a frequency of 1250 per minute and of an amplitude of 2–4 mm. Subsequently the transformed material is cooled.

Example 4

1000 parts by weight of potato starch are intimately mixed with a solution of 15 parts by weight of sodium hydroxide in 100 parts by weight of 60% alcohol, and with a solution of 100 parts by weight of monochloro acetic acid in 150 parts by weight of water and the mixture is dried in a vacuum at 80° C. to a moisture content below 8%. Said pretreated starch mixture is heated in a helical coil at 130° C. for a period of time sufficient to produce a reaction product of the desired viscosity. Oscillations of a frequency of 1250 per minute and of an amplitude of 2–4 mm. are applied to said coil during said reaction.

The reaction time preferably is between 5 minutes and 50 minutes. The reaction product is subsequently cooled.

*Example 5*

Sodium alginate containing about 5% of moisture is heated, while passing through a helical coil, to 120° C. during 12 minutes. Oscillations of a frequency of 1250 per minute and of an amplitude of 2–4 mm. are applied to said coil during the passage of the alginate through the coil. Subsequently the heated material is cooled in a second helical coil also subjected to oscillations of a frequency of 1250 per minute and of an amplitude of 2–4 mm. A product is obtained the aqueous solutions of which have a considerably lower viscosity than solutions of the starting material.

The term "high molecular carbohydrates" is used herein to describe polysaccharides or high molecular weight polymers of pentose or hexose units.

In place of helical tubes or troughs, inclined straight tubes or troughs so arranged as to convey the material to be transformed by oscillation or vibration and to turn and uniformly expose the material to the treating conditions may be used, and various other modifications and changes may be made in the apparatus and process illustrated and described without departing from the spirit of our invention or the scope of the following claims.

We claim:

1. In a process for dextrinizing starch, the steps comprising moistening starch with a dilute aqueous solution of a mineral acid selected from the group consisting of hydrochloric acid and nitric acid, drying said acid-treated starch to form a pourable starch powder, passing said starch powder through a spiral tube conveyor while heating by indirect heat exchange at a temperature between about 120° C. and about 200° C., effecting movement of said starch to be dextrinized through said spiral tube conveyor by vibrating said conveyor, said vibrations having a frequency of about 1250 per minute and an amplitude of about 2–4 mm., and discharging the resulting dextrinized starch as soon as the desired degree of dextrinization is achieved.

2. In a process of dextrinizing starch according to claim 1, wherein dextrinization is carried out at about 170° C., and vibrations of a frequency of about 1250 per minute and of an amplitude of about 2–4 mm. are applied to said conveyor.

3. In a process of producing ethers of high molecular carbohydrates, the steps comprising mixing a high molecular carbohydrate with an etherifying agent, converting such mixture into a pourable pulverulent material, passing said pulverulent mixture through a spiral tube conveyor while heating to etherification temperatures of between 100° C. and 250° C., effecting movement of said etherification mixture through said conveyor by vibrating said conveyor, said vibrations having a frequency of about 1250 per minute and an amplitude of about 2–4 mm., and discharging the resulting etherified carbohydrate as soon as the desired degree of etherification is achieved.

4. In a process of producing ethers of high molecular carbohydrates according to claim 3, wherein the carbohydrate is starch and the etherifying agent is monochloro acetic acid in the presence of alkali, etherification temperature is about 130° C., and oscillations and vibrations of a frequency of about 1250 per minute and of an amplitude of about 2–4 mm. are applied to said conveyor path.

5. In a process of producing ethers of high molecular carbohydrates according to claim 3, wherein the carbohydrate is an alkali cellulose and the etherifying agent is an agent selected from the group consisting of methyl chloride, ethyl chloride, and ethylene oxide.

6. In a process of reducing the viscosity of alginates, the steps comprising passing a pourable solid alginate, while heating to a temperature between about 30° C. and 140° C., through a closed spiral tube conveyor, effecting movement of said alginate through said conveyor by oscillating and vibrating said conveyor, said vibrations having a frequency of about 1250 per minute and an amplitude of about 2–4 mm., and discharging the resulting heat-treated alginate as soon as the desired reduction in viscosity is achieved.

7. In a process of reducing the viscosity of alginates according to claim 6, wherein the alginate is sodium alginate, the reaction temperature is about 120° C. and oscillations and vibrations of a frequency of about 1250 per minute and of an amplitude of about 2–4 mm. are applied to said conveyor.

8. The method of producing transformation products of compounds selected from the group consisting of high molecular carbohydrates and their derivatives, which comprises heating said compounds by indirect heat exchange to a temperature between about 100° C. and 250° C. while moving the same in a substantially dry, granular, freely pourable form, in direct contact with the walls of a conduit providing a continuous, unbroken inclined path for said compounds, said movement being actuated by reciprocating vibrations imparted to the conduit, said vibrations having a frequency of between about 500 and about 2000 per minute and an amplitude of between about 1 mm. and about 5 mm.

9. The method of producing transformation products of compounds selected from the group consisting of high molecular carbohydrates and their derivatives, which comprises heating said compounds by indirect heat exchange to a temperature between about 100° C. and 250° C. while moving the same, in a substantially dry, granular, freely pourable form, through a spiral conduit, said movement being actuated by reciprocating vibrations imparted to said conduit, said vibrations having a frequency of between about 500 and about 2000 per minute and an amplitude of between about 1 mm. and about 5 mm.

10. The method of producing degradation products of compounds selected from the group consisting of starch products and their derivatives, which comprises continuously feeding said compounds, in the form of a substantially dry, granular, freely pourable mass, into one end of a spiral tube conduit, moving said compounds through said conduit by imparting reciprocating vibrations to said conduit, said vibrations having a frequency of between about 500 and about 2000 per minute and an amplitude of between about 1 mm. and about 5 mm., heating said mass by indirect heat exchange to a temperature between about 100° C. and 250° C. while the same is being moved through said conduit, and continuously discharging the degradation products at the other end of said conduit.

11. The method of transforming compounds selected from the group consisting of high molecular carbohydrates and their derivatives, which comprises moving said compounds, in the form of a substantially dry, granular, freely pourable mass, through a helical conduit, and heating said mass by indirect heat exchange to a temperature between about 100° C. and 250° C. while the same is passing through said conduit, the movement of the mass through the conduit being effected by reciprocating vibrations imparted to said conduit, said vibrations having a frequency of between about 500 and about 2000 per minute and an amplitude of between about 1 mm. and about 5 mm.

12. The method of claim 8 wherein the movement of the freely pourable high molecular carbohydrates with respect to the inclined path is downward.

13. The method of claim 8 wherein the movement of the freely pourable high molecular carbohydrates with respect to the inclined path is upward.

(References on following page)

References Cited in the file of this patent

UNITED STATES PATENTS

| | | |
|---|---|---|
| 2,233,243 | Burns | Feb. 25, 1941 |
| 2,274,789 | Horesi | Mar. 3, 1942 |
| 2,494,191 | Neumann | Jan. 10, 1950 |
| 2,508,884 | Hereng | May 23, 1950 |

FOREIGN PATENTS

| | | |
|---|---|---|
| 21,314 | Great Britain | of 1895 |
| 456 | Great Britain | of 1878 |
| 3,639 | Great Britain | of 1874 |

OTHER REFERENCES

Walton: Starch Chem., vol. 1, New York, 1928, pp. 160–167.

Scientific American, April 1940, pp. 216 and 217.